US009521292B2

(12) United States Patent
Emery (10) Patent No.: US 9,521,292 B2
(45) Date of Patent: Dec. 13, 2016

(54) IMAGE SENSOR APPARATUS AND METHOD FOR EMBEDDING RECOVERABLE DATA ON IMAGE SENSOR PIXEL ARRAYS

(75) Inventor: Robbert Emery, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 928 days.

(21) Appl. No.: 12/047,267

(22) Filed: Mar. 12, 2008

(65) Prior Publication Data

US 2009/0231455 A1  Sep. 17, 2009

(51) Int. Cl.
*H04N 1/32* (2006.01)
*H04N 5/232* (2006.01)

(52) U.S. Cl.
CPC ...... *H04N 1/32203* (2013.01); *H04N 1/32208* (2013.01); *H04N 1/32229* (2013.01); *H04N 5/23229* (2013.01); *H04N 2201/327* (2013.01); *H04N 2201/3215* (2013.01); *H04N 2201/3226* (2013.01); *H04N 2201/3252* (2013.01); *H04N 2201/3253* (2013.01)

(58) Field of Classification Search
None
See application file for complete search history.

(56) References Cited

U.S. PATENT DOCUMENTS

| | | | |
|---|---|---|---|
| 6,525,768 B2 | 2/2003 | Obradovich | |
| 7,222,235 B1* | 5/2007 | Mitsui | 713/176 |
| 7,502,489 B2* | 3/2009 | Rhoads | 382/100 |
| 2004/0039914 A1* | 2/2004 | Barr et al. | 713/176 |
| 2004/0119831 A1* | 6/2004 | Miyawaki | 348/207.99 |
| 2004/0125125 A1* | 7/2004 | Levy | 345/716 |
| 2004/0263911 A1* | 12/2004 | Rodriguez et al. | 358/3.28 |
| 2004/0264735 A1* | 12/2004 | Rhoads | 382/100 |
| 2005/0041120 A1* | 2/2005 | Miller | 348/239 |
| 2005/0151854 A1* | 7/2005 | Maki | 348/222.1 |
| 2005/0169499 A1* | 8/2005 | Rodriguez et al. | 382/100 |
| 2007/0274611 A1 | 11/2007 | Rodriguez et al. | |

FOREIGN PATENT DOCUMENTS

WO  WO2006/117968  * 11/2006

OTHER PUBLICATIONS

[Online document] "GPS Tagged JPEGS," Posted by Dav, May 24, 2003, pp. 1-8, [retrieved from the internet on Mar. 11, 2008 at URL: http://akuaku.org/archives/2003/05/gps_tagged_jpeg.shtml].
[Online document] "DYI Black Box (Tagging Photos with GPS Coordinates," Posted by Phillip Torrone, Sep. 17, 2004, pp. 1-15, [retrieved from the internet on Mar. 11, 2008 at URL: http://www.engadget.com/2004/09/17/diy-black-box-tagging-photos-with-gps-coordinates].

(Continued)

Primary Examiner — Albert Cutler
(74) Attorney, Agent, or Firm — Lathrop & Gage LLP (57) ABSTRACT

An image sensor apparatus is disclosed. The image sensor apparatus includes an image sensor for generating image data in a pixel array corresponding to an optical image. A processor alters the image data to embed a feature-dependent code associated with a feature of the image data in a feature-dependent location in the pixel array and generate a digital image from the altered image data.

31 Claims, 10 Drawing Sheets

(56) References Cited

OTHER PUBLICATIONS

[Online document] "How to GPS Tag Photos: Flickr, Mappr, Google Earth..," pp. 1-16, [retrieved from the Internet on Mar. 11, 2008 at URL: http://blog.makezine.com/archive/2005/07/how_to_gps_tag.html].

[Online document] "Navman iCN750 GPS/Digital Camera Tags Pictures w/ Coordinates," pp. 1-6, [retrieved from the internet on Mar. 11, 2008 at URL: http://www.gadgetreview.com/2006/04/navman-icn750-gpsdigital-camera-tags-pictures-w-coordinates.html].

[Online document] "GeoPic II Geotagging Unit for Nikon Cameras," pp. 1-3, [retrieved from the internet on Mar. 11, 2008 at URL: http://customidea.com/shop/support/GeoPicIIRelease.pdf].

[Online document] "Sony GPS-CS1: Tags Photos with Location," pp. 1-9, [retrieved from the internet on Mar. 11, 2008 at URL: http://gizmodo.com/gadgets/digital-cameras/sony-gps+cs1-tags-photos-with-location-191454.php].

\* cited by examiner

IMAGE SENSOR APPARATUS AND METHOD FOR EMBEDDING RECOVERABLE DATA ON IMAGE SENSOR PIXEL ARRAYS

FIELD OF THE INVENTION

This invention relates generally to embedding data in digital images. More particularly, this invention relates to an image sensor apparatus and method for embedding recoverable data on image sensor pixel arrays.

BACKGROUND OF THE INVENTION

Image sensors are semiconductor devices that capture and process light into electronic signals for forming still images or video. Their use has become prevalent in a variety of consumer, industrial, and scientific applications, including digital cameras and camcorders, hand-held mobile devices, webcams, medical applications, automotive applications, games and toys, security and surveillance, pattern recognition, and automated inspection, among others. The technology used to manufacture image sensors has continued to advance at a rapid pace.

There are two main types of image sensors available today: Charge-Coupled Device ("CCD") sensors and Complementary Metal Oxide Semiconductor ("CMOS") sensors. In either type of image sensor, a light gathering photosite is formed on a semiconductor substrate and arranged in a two-dimensional array. The photosites, generally referred to as picture elements or "pixels," convert the incoming light into an electrical charge. The number, size, and spacing of the pixels determine the resolution of the images generated by the sensor.

Modern image sensors typically contain millions of pixels in the pixel array to provide high-resolution images. The image information captured in each pixel, e.g., raw pixel data in the Red, Green, and Blue ("RGB") color space, is transmitted to an Image Signal Processor ("ISP") or other Digital Signal Processor ("DSP") where it is processed to generate a digital image.

Once generated digital images may be stored locally at the image sensor device and/or transferred or transmitted to other devices for future display or processing. For example, digital images generated with digital cameras or hand-held mobile devices are usually transferred or transmitted to a computer or other processing device having a larger memory. The processing device may be able to store, manipulate, and distribute thousands—if not millions—of digital images.

With so many digital images available, it becomes imperative to have applications in place that are able to effectively manage and process vast amounts of digital data. For example, at any given time, a user may be dealing with a variety of digital images that may require archival, identification, time-stamping, geo-stamping, searching, digital enhancement and restoration, segmentation, and/or compression, among other applications. Each application may work with a set of image formats for organizing and storing the visual data, ranging from raw image formats storing raw pixel data to GIF, TIFF, JPEG, and the like.

Managing digital images effectively often requires that some kind of image metadata, i.e., data about the image, be associated with the images. The metadata may be external to the visual data, such as in a header specified by the image format, or incorporated into the visual data itself, thereby allowing the metadata to be automatically accessible with the data. For example, steganography and digital watermarking techniques are typically used to embed a message, tag or code in a digital image to create an embedded image, i.e., a digital image incorporating an embedded code. The embedded code may include metadata such as the source of the image, the image title, copyright information, time-stamps, geo-stamps, and camera settings, among others.

In steganography techniques, the code is made imperceptible and can only be recovered by intended recipients. In digital watermarking techniques, the code may be imperceptible or visible in the image but it is made robust to potential attacks by intruders. Both techniques embed the code in a single or multiple locations in the image. The locations may be selected based on a perceptual or other criteria or on a key without which the code cannot be recovered. An alternative approach spreads the code throughout the image, so that any location in the image may contain some part of the code.

The code may be embedded in the spatial or frequency domain. Spatial-domain techniques directly alter the value of raw data pixels, while frequency-domain techniques alter frequency components of the image to incorporate the code in the image. Frequency-domain techniques may be more robust than spatial-domain techniques, which on the other hand, are less computational intensive and more suitable for applications where speed and power consumption are of crucial importance.

In general, any technique—whether in the spatial or frequency domain—for embedding a message, tag, or code in an image consists of three parts, such as (1) the code itself, (2) an embedding module for embedding the code in the image to generate an embedded image, and (3) a detection module for verifying and detecting the code in the embedded image. As described above, the code may include metadata associated with the image and may consist of a simple sequence of bits. The embedding module may incorporate the code in the spatial or frequency domain and may be implemented on-chip together with an image sensor array or on another chip co-located with the image sensor array or on a remote location. The detection module may be implemented in a processing device capable of receiving and processing embedded images to determine whether they contain an embedded code or whether the embedded code is present in a given embedded image.

For example, previous work on embedding a code in an image in the spatial-domain has included modifying the least significant bits of some or of all pixels in the image to incorporate the code and using pseudo-random numbers to determine the locations in an image for embedding the code, among others. Corresponding previous work for detecting the code in the embedded image has included extracting the code from the least significant bits of the affected pixels and using a key containing the seed of the pseudo-random numbers to identify the locations in the image where the code is embedded, among others.

These and other techniques for embedding a code in digital images are limited in that the code is typically independent of the contents of the image. That is, the code does not depend on whether the image contains a particular scene, object, or person, nor is it used to represent the image's contents. It is often desirable to represent an image based on its contents. For example, current image search techniques on the Internet are based on markup language tags describing the name of image files and the title of the images. Those tags are not, however, embedded in the images themselves and can only be used as part of the markup language.

In addition, techniques for embedding a code in digital images often do not record the location where the code is embedded. Not knowing the location results in the detection module having to use sophisticated techniques or to employ a key to extract the code from the digital image, which takes processing time and without a complete guarantee that the exact location is going to be determined. If the code location is not found or has been tampered with, those techniques fail completely.

Another limitation of the current embedding techniques lies in the fact that they are usually designed for use in a single application where they provide the most benefit, e.g., a digital rights management application. For example, a given embedding technique may not be able to be used to both reliably embed image metadata in an image and to identify the image contents.

Accordingly, it would be desirable to provide an apparatus and method for embedding recoverable data on a digital image that is dependent on features associated with the image and on the location where the data is embedded, and that is robust against tampering.

SUMMARY OF THE INVENTION

An image sensor apparatus has an image sensor for generating image data in a pixel array corresponding to an optical image. A processor alters the image data to embed a feature-dependent code associated with a feature of the image data in a feature-dependent location in the pixel array and generating a digital image from the altered image data.

An embodiment of the invention includes a method for embedding a code in a digital image. Image data in a pixel array of an image sensor corresponding to an optical image is acquired. A feature of interest associated with the image data is identified. The image data is altered in the pixel array to generate a digital image having a feature-dependent code representing the feature of interest embedded in a fixed location of the digital image.

Another embodiment of the invention includes a processor for use in an image sensor device. The processor has a feature module for identifying a feature of interest associated with image data captured by the image sensor device in a pixel array. A signature module creates a feature-dependent code associated with the feature of interest. An embedding module alters the image data to embed the feature-dependent code in a fixed, feature-dependent location in the pixel array.

A further embodiment of the invention includes a system for identifying a feature of a digital image. The system includes an imaging device with executable instructions to generate image data in a pixel array corresponding to an optical image and to alter the image data in the pixel array to generate a digital image having a code associated with a feature of the image data embedded in a known location of the digital image. The system also includes a processing device with executable instructions to receive the digital image from the imaging device and identify the feature of the digital image based on the embedded code and its known location in the digital image.

A yet further embodiment of the invention includes a method for identifying a feature in a digital image. A digital image having an embedded feature-dependent code in a feature-dependent location is received. The digital image is processed to recover one or more pixels in the feature-dependent location. The one or more pixels are compared to the feature-dependent code to identify the feature.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

An image sensor apparatus for embedding a recoverable code in an image sensor pixel array is provided. The recoverable code, as generally used herein, may be any sequence of n bits, where n is at least two. According to an embodiment of the invention, the code is a feature-dependent code, that is, the code is associated with a feature of the digital image. An image feature, as generally used herein, may include any characteristic associated with the image, such as a content-feature pertaining to information associated with the image's contents or a context-feature pertaining to information associated with the context in which the image is generated. A content-feature may include, for example, an object represented in the image, a source of the image, an identification of the image, a video cue, a search cue, and so on. A context-feature may include, for example, time-stamps, geo-stamps, image sensor device settings, or any other such feature.

In an embodiment of the invention, the feature-dependent code is embedded in a fixed, feature-dependent location in the pixel array. The feature-dependent location, as generally used herein, may be any location associated with the feature, such as a pre-determined location that is fixed for the selected feature. The feature-dependent location may include one or more pixels that are spatially-apart in the pixel array.

For example, consider a feature-dependent code "A" representing a content-feature such as the presence of a person in an image, a feature-dependent code "B" representing a content-feature such as a source of the image, and a feature-dependent code "C" representing a context-feature such as a geo-stamp corresponding to a geographical location where the image is generated. Each one of these feature-dependent codes may be embedded in the image in a different and fixed, feature-dependent location.

For example, the feature-dependent code "A" may be embedded in a feature-dependent location "L1", the feature-dependent code "B" may be embedded in a feature-dependent location "L2", and the feature-dependent code "C" may be embedded in a feature-dependent location "L3." Locations L1, L2, and L3 each correspond to a different group of pixels.

According to an embodiment of the invention an embedded image may contain more than one feature-dependent code. The embedded image may be stored locally in the image sensor apparatus generating the image or transferred to another processing device. The processing device, upon receiving an embedded image, may detect whether a given feature-dependent code is present in the embedded image in its corresponding feature-dependent location, as described in more detail herein below.

In one embodiment, a feature-dependent code is embedded in the digital image by altering the value of the pixels in the fixed, feature-dependent location. Furthermore, an error correction code such as a Cyclic Redundancy Check ("CRC") of the feature-dependent code may be embedded in the digital image to provide robustness against image tampering.

Figure 1:
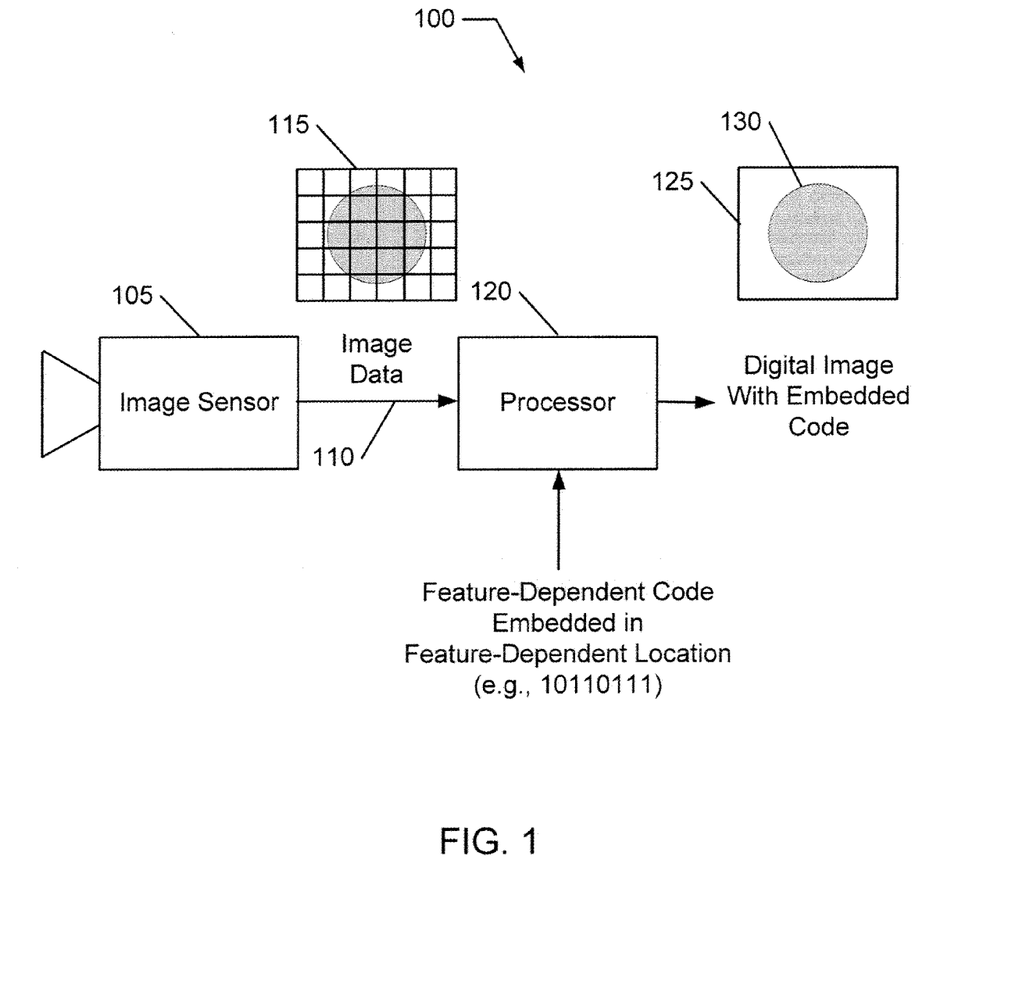
FIG. 1 illustrates an image sensor apparatus constructed in accordance with an embodiment of the invention.

FIG. 1 illustrates an image sensor apparatus constructed in accordance with an embodiment of the invention. Image sensor apparatus 100 includes image sensor 105 for generating image data 110 in a pixel array corresponding to an optical image. Image data 110 includes raw pixel data 115 generated by image sensor 105 and may also include blanking intervals, metadata associated with image sensor 105, timing data, or any other data associated with image sensor 105 or a user of image sensor apparatus 100.

Image sensor apparatus 100 also includes processor 120 for generating digital image 125 from image data 110. In accordance with an embodiment of the invention, processor 120 alters one or more pixels in raw pixel data 115 to embed a feature-dependent code in digital image 125. The one or more pixels are in a fixed, feature-dependent location associated with a feature of the image data 110 such as for example, an object represented in the image data 110, a source of digital image 125, an identification of digital image 125, a video cue, a search cue, or other representations of image context, including, but not limited to, timestamps, geo-stamps, and image sensor device settings.

In one embodiment, the feature-dependent location may be fixed for the particular feature selected. For example, a given location "A" may be selected to embed feature-dependent codes representing an object in the image, another location "B" may be selected to embed feature-dependent codes representing the source of the image, another location "C" may be selected to embed feature-dependent codes representing a geo-stamp associated with the images, and so on. The locations A, B, and C may each represent fixed positions in the pixel array, such as different pixels spatially-apart along the quadrants of the pixel array, as described below.

For example, the feature-dependent code may be used to indicate that ball 130 is present in digital image 125 or that digital image 125 corresponds to an image of a ball, that digital image 125 originated from image sensor apparatus 100 registered to a particular user, that ball 130 corresponds to a scene change in a given sequence of image frames generated by image sensor apparatus 100, that "ball" is an appropriate search cue for digital image 125, that digital image 125 was taken at a particular time of the day, at a given geographical location, with given settings for image sensor apparatus 100, and so on.

The location of the feature-dependent location in each one of these applications, according to an embodiment of the invention, is fixed and pre-determined for each application. That is, application A may embed feature-dependent codes in location A, application B may embed feature-dependent codes in location B, and so on.

The feature-dependent code may be any sequence of n-bits, where n is at least two. In an embodiment of the invention, the feature-dependent code is embedded by altering selected pixels in pixel data 115 in such a way as to make the feature-dependent code imperceptible to a human observer of digital image 125. The feature-dependent code may be embedded by altering the values of the selected pixels in pixel data 115 within any range that is perceptually insignificant.

According to an embodiment of the invention, the feature-dependent code and the feature-dependent location may be determined by processor 120 or selected by a user of image sensor apparatus 100 when generating digital image 125. In the first case, for example, processor 120 may automatically determine, according to the application, that a given code is to be embedded in a given location of pixel data 115. In the second case, the user may select on the fly which feature of the image is to be represented by the code.

Digital image 125 is made robust against tampering by adding an error correction code such as a Cyclic Redundancy Check ("CRC") of the feature-dependent code around the perimeter of the image. The CRC code acts as a backup of the feature-dependent code and can be used to recover the code when the code has been tampered with. The CRC code also provides a backup in the occasion that the feature-dependent code matches the values of the selected pixels. In this case, when the selected pixels to be altered already have values corresponding to the feature-dependent code, it would not be clear to a processing device receiving the image whether the pixels had been altered or not. The presence of the CRC code may be then be used as an indication that indeed a code is present in the image.

It is appreciated that digital image 125 with the embedded feature-dependent code may be stored locally in image sensor apparatus 100 and/or transferred to another processing device. The processing device may then manipulate and process digital image 125 to extract the feature-dependent code according to numerous applications, as exemplified in more detail herein below.

For example, in one application, the feature-dependent code may be used to register digital image 125 to a particular user of image sensor apparatus 100. The processing device, when receiving digital image 125 may then extract the feature-dependent code to automatically archive digital image 125 to an archive folder corresponding to the user. In another application, the feature-dependent code may be used to identify a keyword to be used as a search cue. The processing device, when queried for images of a certain category may extract the feature-dependent code to identify digital image 125 as an image responsive to the query.

Figure 2:
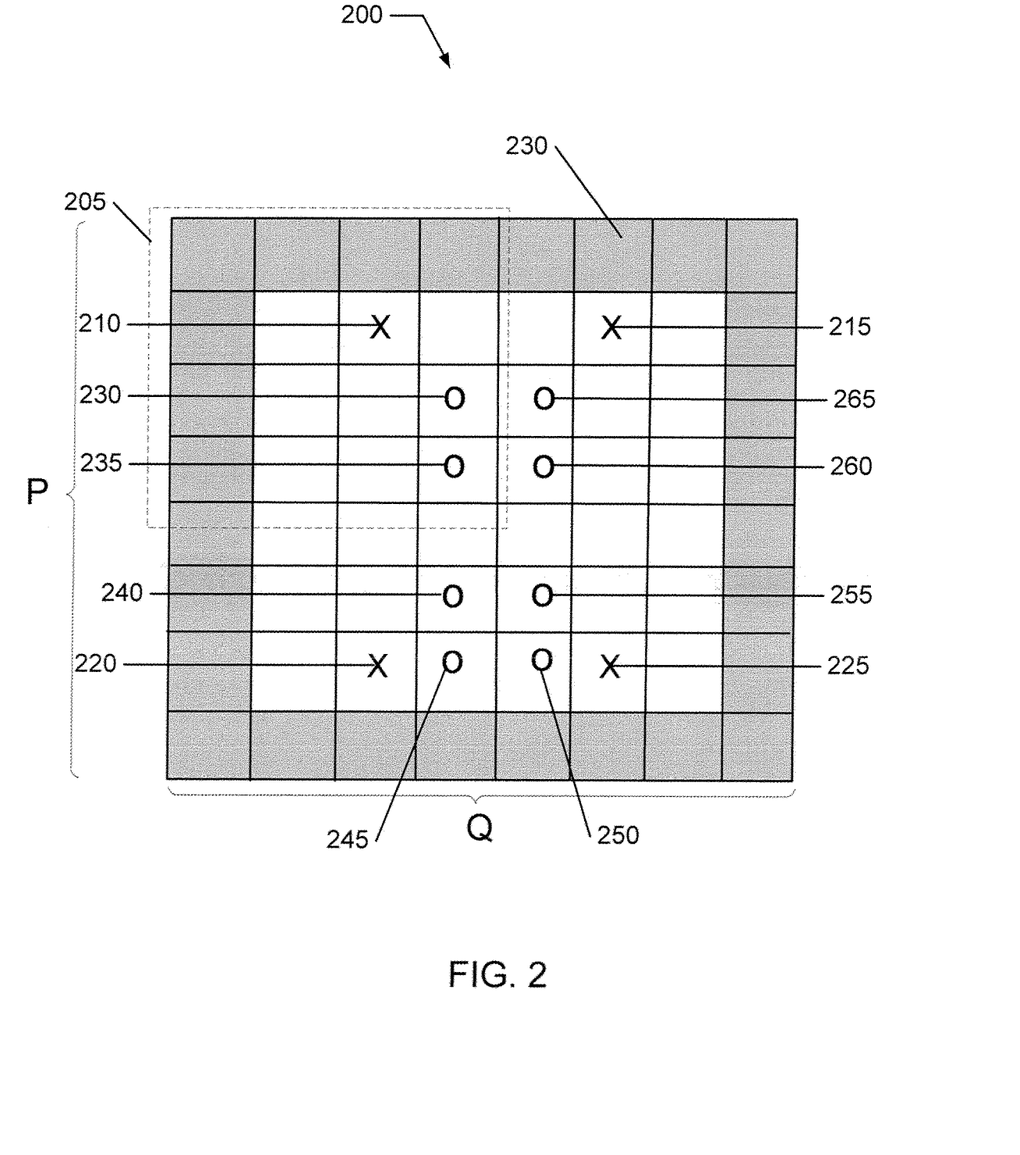
FIG. 2 illustrates a schematic diagram of a pixel array having a feature-dependent embodiment embedded in a feature-dependent location constructed in accordance with an embodiment of the invention.

Referring now to FIG. 2, a schematic diagram of a pixel array having a feature-dependent code embedded in a feature-dependent location according to an embodiment of the invention is described. Pixel array 200 is formed of P rows and Q columns of pixels. The feature-dependent code may be embedded in any one or more of the pixels in the P×Q pixel array 200.

In one embodiment, the feature-dependent code is embedded in selected pixels in each quadrant of pixel array 200, e.g., quadrant 205. The pixels in each quadrant may be located spatially-apart, such as, for example, pixels 210-225. Pixels 210-225 are altered to represent an n-bit feature-dependent code. Depending on the length of the feature-dependent code, that is, depending on the value of n, the feature-dependent code may be embedded in all of pixels 210-225 simultaneously, or partitioned among pixels 210-225.

For example, if each pixel in pixel array 200 is represented with 8 bits and the feature-dependent code has at most 8 bits, then the feature-dependent code may be repeated in pixels 210-225. Alternatively, if the feature-dependent code has more than 8 bits, than the code may be partitioned among pixels 210-225. For example, if the feature-dependent code has 16 bits, then it may be partitioned into 4 sections of 4 bits, with each 4-bit section embedded in each one of pixels 210-225.

It is appreciated that the feature-dependent code may be partitioned in any way desired among pixels 210-225, as long as it remains perceptually insignificant in the digital image represented in pixel array 200. It is also appreciated that pixels 210-225 are selected for illustration purposes only. Other pixels in pixel array 200 may be used to embed a feature-dependent code, such as, for example, pixels at other fixed, feature-dependent locations in pixel array 200, including pixels 230-265.

It is further appreciated that pixels 210-225 may be fixed when representing a given feature, e.g., feature A, while pixels 230-265 may be fixed when representing another feature, e.g., feature B. It is also appreciated that pixels 210-225 and pixels 230-265 may be simultaneously altered in the same pixel array, that is, each pixel array may have more than one feature-dependent code embedded into it.

For example, feature A may indicate an object in an image and feature B may indicate a source of the image. Feature-dependent codes represented in pixels 210-225 may be used to indicate the presence of a given object in the image, e.g., a person, an animal, a structure, etc., while feature-dependent codes represented in pixels 230-265 may be used to indicate a source of the image e.g., an author, a camera device, etc.

One of ordinary skill in the art appreciates that fixing the location according to the feature it represents enables processing devices receiving embedded images to quickly retrieve the feature-dependent codes from their known, fixed locations. One of ordinary skill in the art also appreciates that the number of pixels used to represent each feature-dependent code may be as desired and as needed according to the length of the code and so long as the code remains perceptually insignificant.

Furthermore, since currently available pixel arrays are in the order of megapixels, altering the value of a few pixels to represent feature-dependent codes leads to no noticeable loss of image quality. Each pixel array may represent multiple feature-dependent codes, thereby enabling a single digital image to be used in multiple applications.

According to an embodiment of the invention, a CRC code is also added in pixel array 200, such as, for example, along perimeter 230. The CRC code provides a backup of the feature-dependent code(s) embedded in pixel array 200 and may be extracted to verify and confirm the presence of the feature-dependent code in pixel array 200.

Figure 3:
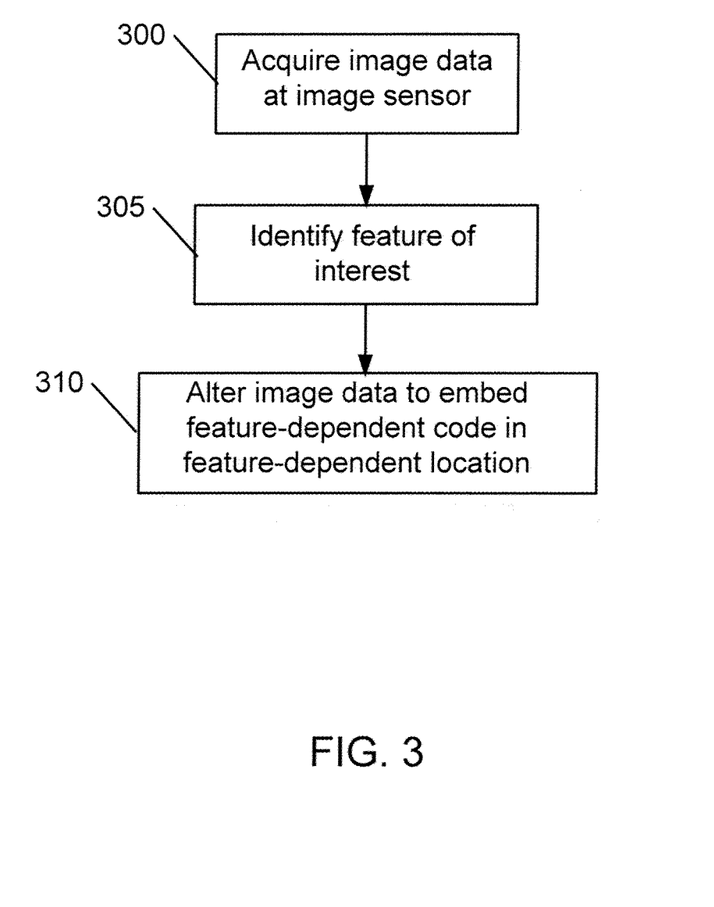
FIG. 3 illustrates a flow chart for embedding a feature-dependent code in a digital image in accordance with an embodiment of the invention.

Referring now to FIG. 3, a flow chart for embedding a feature-dependent code in a digital image in accordance with an embodiment of the invention is described. First, image data is acquired at an image sensor (300). The image data, as described above, is represented in a pixel array. Next, a feature of interest associated with the image data is identified (305). The feature of interest may be a content-feature, e.g., an object represented in the image, a source of the image, an identification of the image, a video cue, a search cue, etc., or a context-feature, e.g., time-stamps, geo-stamps, and image sensor device settings.

Lastly, the image data is altered to generate a digital image having a feature-dependent code representing the feature of interest embedded in a fixed, feature-dependent location of the digital image (310). The fixed location is fixed according to the feature or application, as described above.

Figure 4:
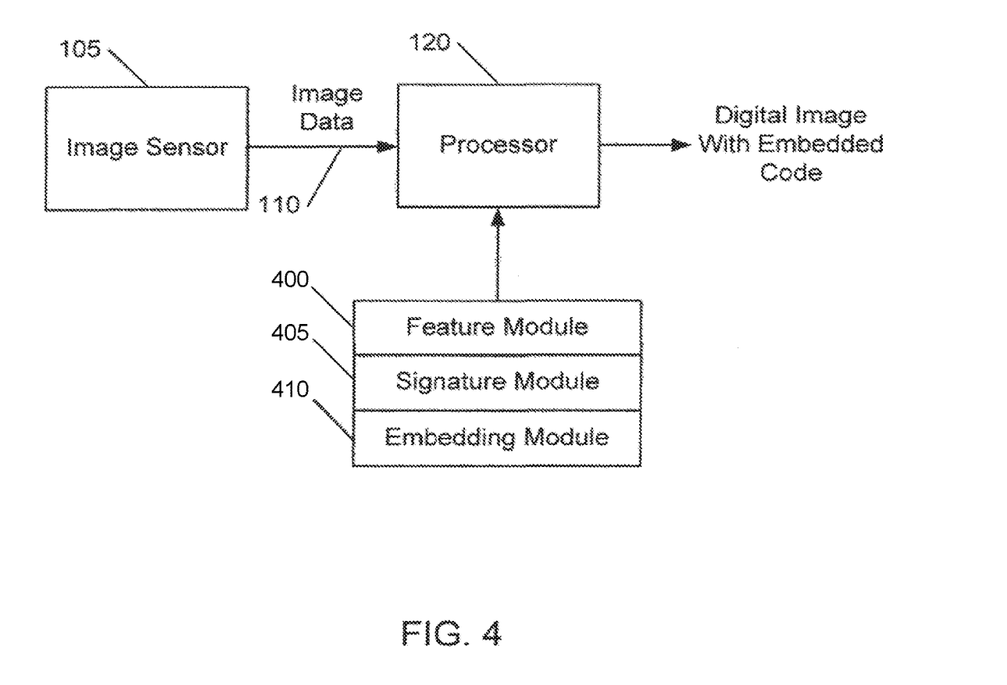
FIG. 4 illustrates a processor for use in an image sensor device in accordance with an embodiment of the invention.

Referring now to FIG. 4, a processor for use in an image sensor device in accordance with an embodiment of the invention is described. Processor 120 receives image data 110 generated by image sensor 105 and embeds one or more feature-dependent codes in image data 110 to generate an embedded digital image, i.e., a digital image having an embedded code.

According to an embodiment of the invention, processor 120 may include a feature module 400, a signature module 405, and an embedding module 410. Feature module 400 may be used to identify a feature of interest associated with image data 110. The feature of interest may include a content-feature, e.g., an object represented in image data 110, a source of the image data, an identification of the image data, a video cue, a search cue, etc., or a context-feature, e.g., time-stamps, geo-stamps, image sensor device settings, and so on.

In identifying the feature of interest, feature module 400 may include an edge detection routine, a segmentation routine, an object detection routine, a scene identification routine, a metadata identification routine, a Global Positioning System ("GPS") routine, or any other routine that may be used to identify an image feature. For example, an edge detection routine, a segmentation routine, and/or an object detection routine may all be used alone or in combination to identify an object in the image, such as a person, animal, structure, and the like.

A scene identification routine may be used to identify a scene change in a sequence of images generated by image sensor 105, and a metadata identification routine may be used to identify any one of a set of metadata associated with image data 110, including, for example, a title to represent the embedded image, an author of the image, and so on. Similarly, a GPS routine may be used to identify latitudinal and longitudinal locations corresponding to a location where image data 110 is being acquired.

Signature module 405 may be used to create a feature-dependent code associated with the feature of interest identified by feature module 400. The feature-dependent code, as described above, may be any n-bit word, with n being at least two, to describe the presence of the feature of interest in image data 110. Embedding module 410 alters image data 110 to embed the feature-dependent code in a fixed, feature-dependent location in the pixel array, as described herein above.

It is appreciated that the feature-dependent code is unique with respect to the particular feature it represents. For example, a given feature-dependent code A may be used to represent a given person A and another feature-dependent code B may be used to represent another person B. Persons A and B may both be instances of the same feature of interest, i.e., a person in image data 110. Feature-dependent codes A and B, albeit different, are embedded in image data 110 in the same fixed, feature-dependent location.

Figure 5:
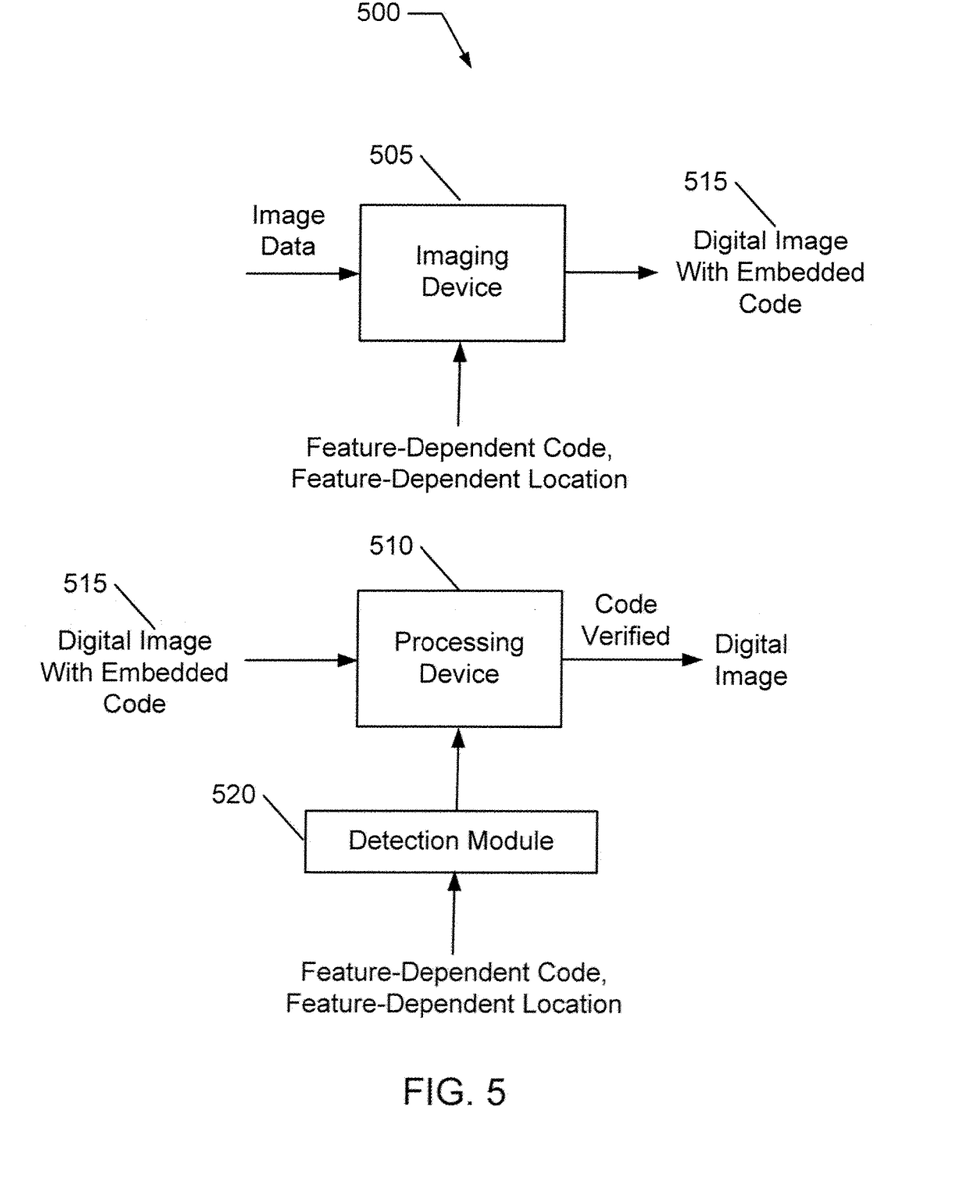
FIG. 5 illustrates a schematic diagram of a system for identifying a feature of a digital image in accordance with an embodiment of the invention.

Referring now to FIG. 5, a schematic diagram of a system for identifying a feature of a digital image in accordance with an embodiment of the invention is described. System 500 includes imaging device 505 and processing device 510. Imaging device 505 may be any image sensor device having an image sensor for generating image data in a pixel array corresponding to an optical image. In accordance with an embodiment of the invention, imaging device 505 also includes executable instructions for altering the image data generated by the image sensor to generate an embedded image 515 that has a feature-dependent code embedded therein in a fixed, feature-dependent location in the pixel array, as described above. In one embodiment, a CRC of the feature-dependent code is included in the embedded image 515 to protect the image against tampering.

Processing device 510 receives the embedded image 515 from imaging device 505. It is appreciated that processing device 510 and imaging device 505 may be integrated in one device, for example, a camera, or may be separate devices, for example, imaging device 505 may be a camera and processing device 510 may be a computer connected to the camera.

According to an embodiment of the invention, processing device 510 has a detection module 520 for identifying a feature of the embedded digital image 515 based on the feature-dependent code embedded therein in the fixed, feature-dependent location. The feature may be any characteristic associated with the image including information on the image's contents or on the image's context, such as, for example, the image's source, a geo-location corresponding to the location where the image was generated, a time-stamp corresponding to the time when the image was generated, the presence of a given person in the image, and so on.

In identifying the feature of interest in the embedded image 515, detection module 520 extracts the values of the pixels from the fixed, feature-dependent location, and compares them to the feature-dependent code. When a match is found, that is, when the presence of the feature-dependent code is detected in the embedded image 515, the desired feature is identified.

When a match is not found, detection module 520 decodes the CRC of the feature-dependent code to verify whether the code was present in the image but perhaps modified before the embedded image 515 was received by processing device 510. For example, embedded image 515 could be altered by an intruder before reaching processing device 510. The pixel values in the fixed, feature-dependent location containing the feature-dependent code could have been modified in such a way that detection module 520 would not be able to detect the presence of the feature-dependent code unless decoding the CRC code as a backup.

It is appreciated that processing device 510 may be used to identify features of images in a plethora of applications, including, but not limited to applications to recognize the presence of an object in an image, applications to identify a metadata associated with an image, image search applications, and so on. Some examples are described in more detail herein below.

It is also appreciated that a user may provide input to imaging device 505 in identifying the feature of interest. For example, a user may select with controls on the imaging device 505 a given object in the image. The user may also be able to select via a menu in the imaging device 505 features of the image to be represented with the feature-dependent code, such as, for example, a title for the image, an author of the image, and the like.

Figure 6:
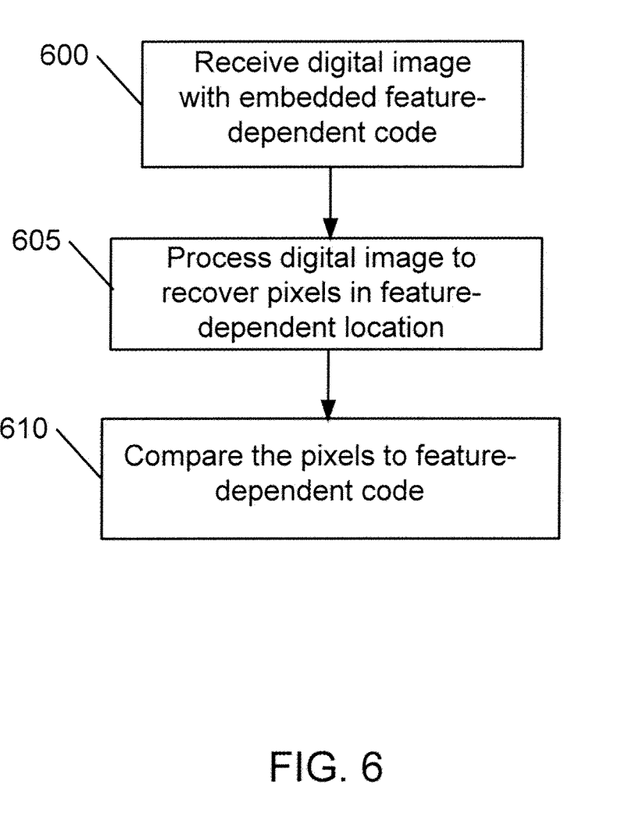
FIG. 6 illustrates a flow chart for identifying a feature in a digital image in accordance with an embodiment of the invention.

Referring now to FIG. 6, a flow chart for identifying a feature in a digital image in accordance with an embodiment of the invention is described. First, a digital image is received with a feature-dependent code embedded in a fixed, feature-dependent location therein (600). Next, the digital image is processed to recover the values of the pixels in the feature-dependent location (605).

The values of the pixels are then compared to the feature-dependent code to identify whether the pixel values are as expected, i.e., to verify whether the pixel values match the value of the feature-dependent code (610). If a match is not found, the feature-dependent code may be extracted by decoding a CRC code embedded in the digital image. As described above, the CRC code may be embedded along the perimeter of the digital image.

Figure 7:
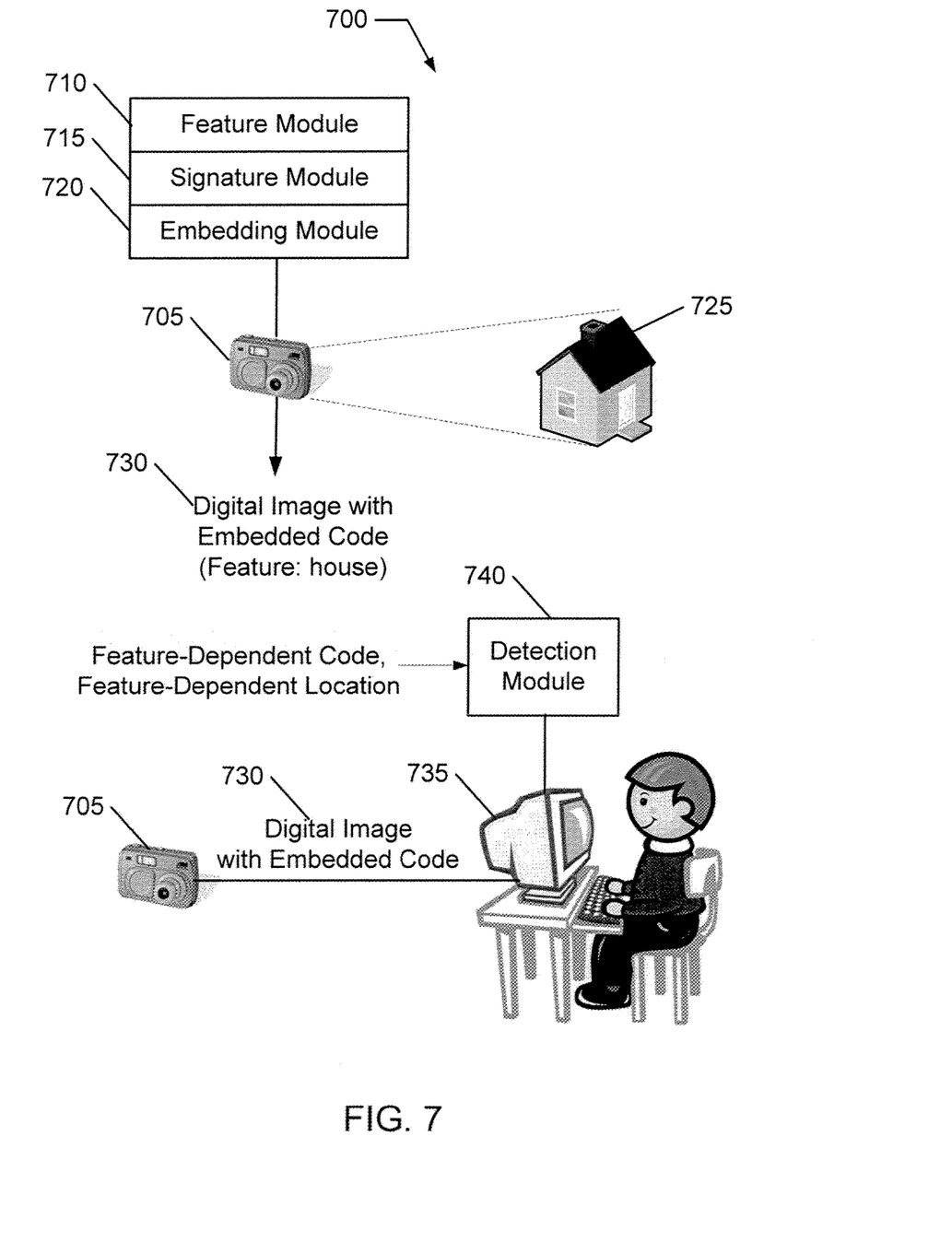
FIG. 7 illustrates an application in which one or more embodiments of the invention may operate.

Referring now to FIG. 7, an application in which one or more embodiments of the invention may operate is described. Application 700 may be a real-estate application in which a real-estate professional is amassing a database or collection of information associated with real-estate properties. A real-estate professional may use camera 705 to take pictures of real-estate properties and generate digital images corresponding to those properties.

In accordance with an embodiment of the invention, camera 705 includes a feature module 710 for identifying house 725 in a pixel array generated by camera 705. Once identified, camera 705 employs signature module 715 for creating a feature-dependent code to be embedded in a fixed, feature-dependent location in the pixel array. The identification of the house and the feature-dependent code may occur automatically by camera 705. Alternatively, both the house identification and the feature-dependent code may be aided by a user, who may operate camera 705 with controls or menus to select house 725 in an image display in camera 705 and provide a code for identifying the house.

Camera 705 also has an embedding module 720 for embedding the feature-dependent code in the feature-dependent location of the pixel array. A digital image 730 containing the embedded code is then generated and transferred to processing device 735. Processing device 735 may be, for example, a computer accessed by a real-estate professional.

In accordance with an embodiment of the invention, processing device 735 includes a detection module 740 for extracting the feature-dependent code from the fixed, feature-dependent location from digital image 730, as described above. As one of ordinary skill in the art appreciates, the feature-dependent code may contain any information associated with house 725, such as, for example, a description of the house, its status in the market, its location, and so on.

Figure 8:
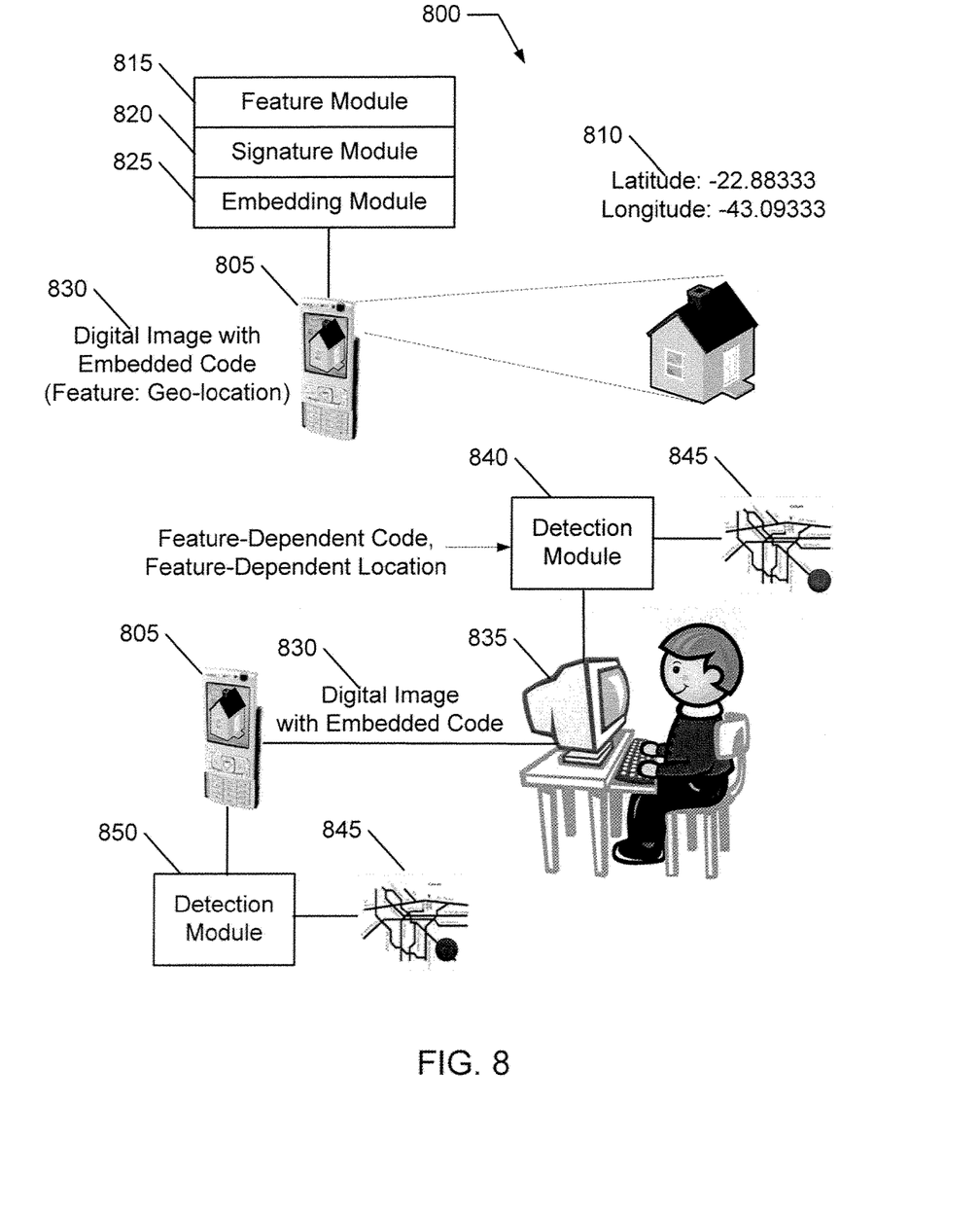
FIG. 8 illustrates another application in which one or more embodiments of the invention may operate.

Referring now to FIG. 8, another application in which one or more embodiments of the invention may operate is described. Application 800 may be a photography application in a mobile device 805, which may be any mobile device equipped with an image sensor apparatus of the invention. For example, a user may use mobile device 805 to take pictures of objects, people, landscapes, etc., at his/her own leisure, and generate digital images corresponding to the pictures taken.

In accordance with an embodiment of the invention, the user may use mobile device 805 to identify the pictures taken with feature-dependent codes associated with features of the images, such as, for example, latitudinal and longitudinal locations 810 corresponding to where the picture was taken. Mobile device 805 includes a feature module 815 for identifying location 810, by using, for example, GPS routines. Once identified, mobile device 805 employs signature module 820 for creating a feature-dependent code to be embedded in a fixed, feature-dependent location in the pixel array generated by mobile device 805.

It is appreciated that the identification of the location and the feature-dependent code may occur automatically by mobile device 805. Alternatively, both the location identification and the feature-dependent code may be aided by a user, who may operate mobile device 805 with controls or menus to provide a location and a code for identifying the picture taken. It is also appreciated that latitudinal and longitudinal locations 810 are used for illustration purposes only. The user could, for example, select an address, a city, or other such location identifier to identify the picture taken.

Mobile device 805 also has an embedding module 825 for embedding the feature-dependent code in the feature-dependent location of the pixel array. A digital image 830 containing the embedded code is then generated and transferred to processing device 835. Processing device 835 may be, for example, a computer or other such processing device capable of connecting with mobile device 805 and processing images transferred from mobile device 805.

In accordance with an embodiment of the invention, processing device 835 includes a detection module 840 for extracting the feature-dependent code from the fixed, feature-dependent location from digital image 830, as described above. Upon extracting the feature-dependent code from digital image 830, detection module 840 may interact with other modules in processing device 835 to display a map showing the location represented in the extracted feature-dependent code along with the digital image 830.

As one of ordinary skill in the art appreciates, mobile device 805 may also have a detection module 850, that is, mobile device 805 may also act as a processing device. Detection module 850 may be used to extract the feature-dependent code from digital image 830 at any time so that the user can verify the location in a displayed map, such as map 845.

Figure 9:
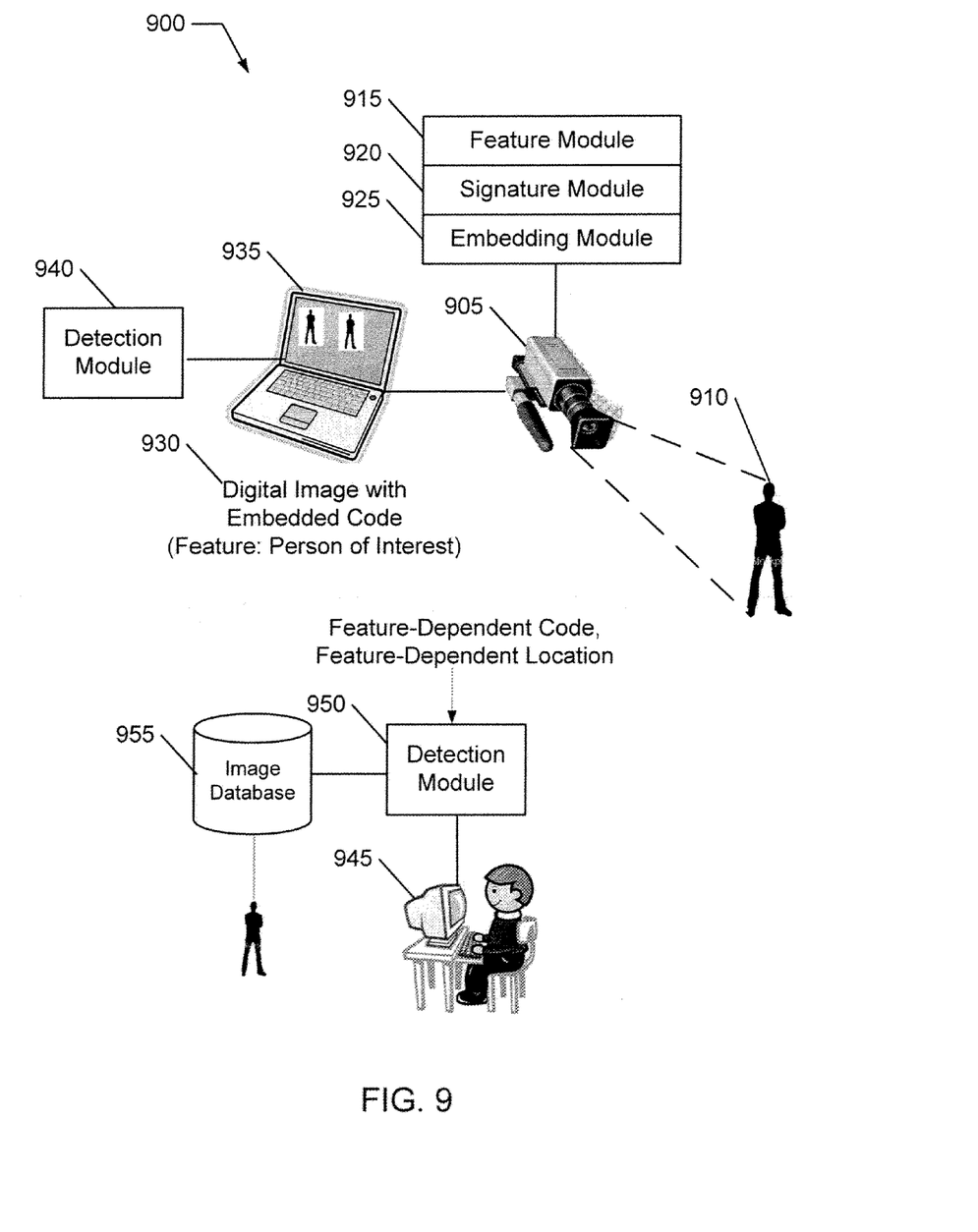
FIG. 9 illustrates yet another application in which one or more embodiments of the invention may operate.

Referring now to FIG. 9, another application in which one or more embodiments of the invention may operate is described. Application 900 may be a security application in which a security camera 905 is used real-time to take snapshots of potential suspects, such as potential suspect 910. Security camera 905 may generate digital images corresponding to different suspects, which can then be analyzed by a security or other forensics professional to investigate a potential burglar, thief, parolee, and the like.

In accordance with an embodiment of the invention, security camera 905 includes a feature module 915 for identifying suspect 910 in a pixel array generated by camera 905. Once identified, camera 905 employs signature module 920 for creating a feature-dependent code to be embedded in a fixed, feature-dependent location in the pixel array. The identification of the suspect and the feature-dependent code may occur automatically by camera 905. Alternatively, both the suspect identification and the feature-dependent code may be aided by a user, who may operate camera 905 with controls or menus to select suspect 910 in an image display in camera 905 and provide a code for identifying the suspect.

Camera 905 also has an embedding module 925 for embedding the feature-dependent code in the feature-dependent location of the pixel array. A digital image 930 containing the embedded code is then generated and transferred to processing device 935. Processing device 935 may be, for example, a computer accessed by the security professional to identify potential suspects.

In accordance with an embodiment of the invention, processing device 935 include a detection module 940 for extracting the feature-dependent code from the fixed, feature-dependent location from digital image 930, as described above. As one of ordinary skill in the art appreciates, the feature-dependent code may contain any information associated with suspect 910, such as, for example, an identification of the suspect's presence in the digital image 930, the suspect's hair color, the suspect's height, and so on.

It is appreciated that digital image 930 may be transferred to more than one processing device. For example, digital image 930 may be transferred to processing device 945, which may be a computer connected to an image database 955. Processing device 945 may be used to identify suspects from an suspect database by detecting images that contain feature-dependent codes associated with a characteristic of the suspect, e.g., the suspect's hair color, height, etc.

Figure 10:
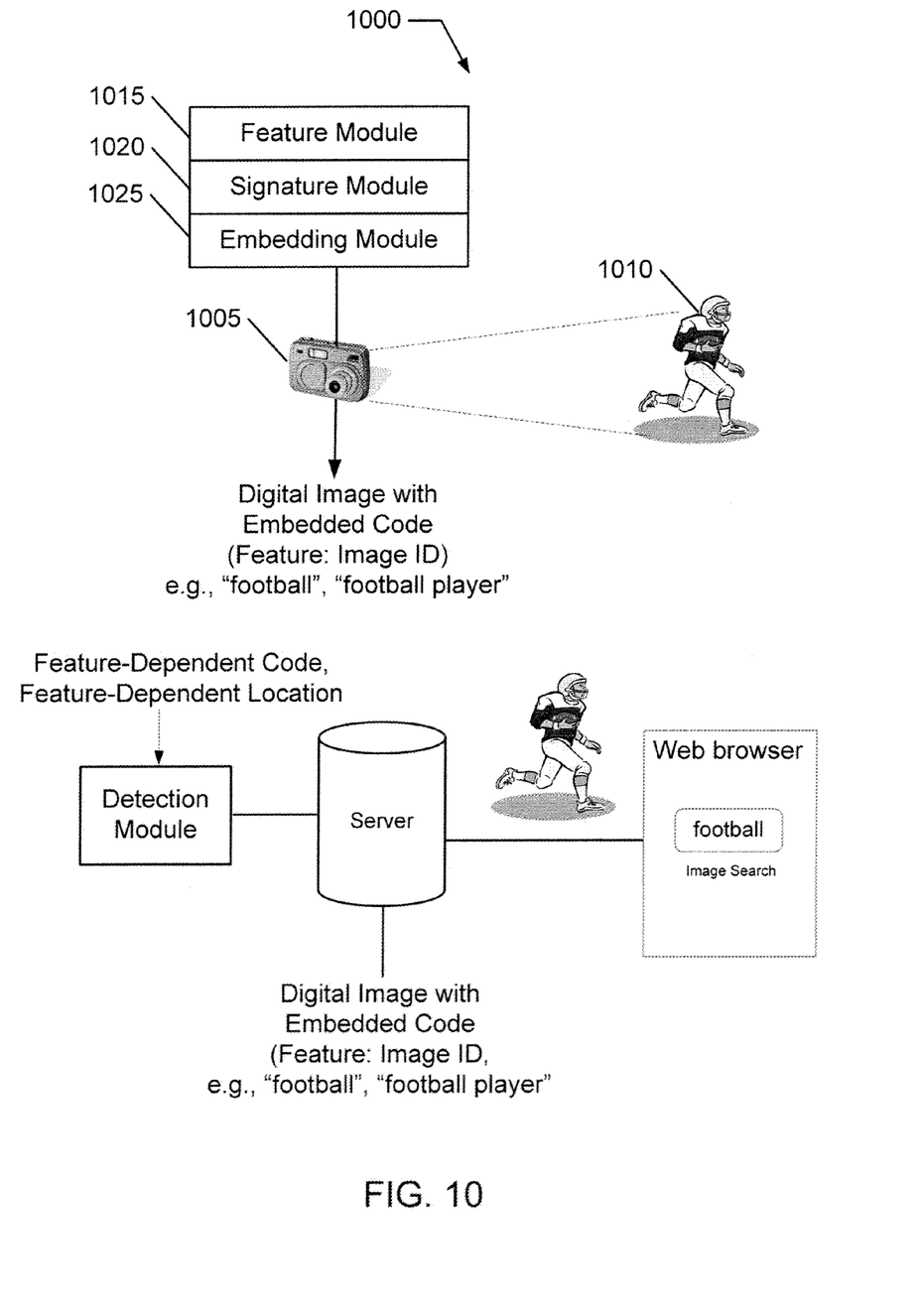
FIG. 10 illustrates a further application in which one or more embodiments of the invention may operate.

Referring now to FIG. 10, an application in which one or more embodiments of the invention may operate is described. Application 1000 may be an image search application in which pictures taken with camera 1005 are identified with feature-dependent codes that may be used to aid image search queries. For example, picture 1010 showing a football player may be identified with a feature-dependent code representing a search keyword, such as "football," "football player," and the like.

In accordance with an embodiment of the invention, camera 1005 includes a feature module 1015 for identifying picture 1010 in a pixel array generated by camera 1005. Once identified, camera 1005 employs signature module 1020 for creating a feature-dependent code to be embedded in a fixed, feature-dependent location in the pixel array. The identification of the picture and the feature-dependent code may occur automatically by camera 1005. Alternatively, both the picture identification and the feature-dependent code may be added by a user, who may operate camera 1005 with controls or menus to select a keyword to represent picture 1010 in an image display in camera 1005.

Camera 1005 also has an embedding module 1025 for embedding the feature-dependent code in the feature-dependent location of the pixel array. A digital image 1030 containing the embedded code is then generated and transferred to processing device 1035. Processing device 1035 may be, for example, a web server.

In accordance with an embodiment of the invention, processing device 1035 includes a detection module 1040 for extracting the feature-dependent code from the fixed, feature-dependent location from digital image 1030, as described above. As appreciated by one of ordinary skill in the art, a web browser 1045 may be accessed by a user to perform an image search with the keyword "football." In response to the search query, processing device 1035 may then trigger detection module 1040 to search for images stored therein that contain the feature-dependent code corresponding to the word "football" in the fixed, feature-dependent location.

Advantageously, the image sensor apparatus of the invention enables any data to be robustly embedded in a digital image without affecting the perceptual quality of the image. In contrast to traditional approaches to data embedding, feature-dependent codes are embedded in fixed, feature-dependent locations, thereby enabling a single image to represent data for multiple applications.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. An image sensor apparatus, comprising:
    an image sensor for generating image data in a pixel array corresponding to an optical image; and
    a processor for:
        altering the image data to embed a first feature-dependent code associated with a first feature of the image data and a second feature-dependent code associated with a second feature of the image data, and
        generating a digital image from the altered image data,
    wherein the first feature-dependent code is embedded at a first fixed location of the pixel array, the second feature-dependent code is embedded at a second fixed location of the pixel array, the first fixed location and second fixed location each corresponding to a different non-overlapping group of pixels within the pixel array, the first and second fixed locations being predetermined based upon a respective type of the first and second features and distinct from a respective location of the first and second features within the image data.

2. The image sensor apparatus of claim 1, wherein the image data comprises a CRC of the first and second feature-dependent codes embedded in a perimeter of the pixel array.

3. The image sensor apparatus of claim 1, wherein each of the first and second feature-dependent codes comprises an n-bit word, wherein n is at least two.

4. The image sensor apparatus of claim 3, wherein the processor alters the value of one or more pixels in the pixel array to represent the n-bit word.

5. The image sensor apparatus of claim 4, wherein the one or more pixels are spatially apart in quadrants of the pixel array.

6. The image sensor apparatus of claim 5, wherein each of the first and second feature-dependent codes is perceptually insignificant to an observer of the digital image.

7. The image sensor apparatus of claim 6, wherein each of the first and second feature-dependent codes comprises a user-selectable code.

8. The image sensor apparatus of claim 1, wherein at least one of the first and second features of the image data comprises a content-feature and a context-feature.

9. The image sensor apparatus of claim 1, the embedded first feature-dependent code and the embedded second feature-dependent code being imperceptible to a human observer of the optical image.

10. A method for embedding codes in a digital image, comprising:
    acquiring image data in a pixel array of an image sensor device corresponding to an optical image;
    identifying a first feature of interest associated with the image data and a second feature of interest associated with the image data; and
    altering the image data in the pixel array to generate a digital image having a first feature-dependent code representing the first feature of interest and a second feature-dependent code representing the second feature of interest, wherein the first feature-dependent code is embedded at a first fixed location of the pixel array, the second feature dependent code is embedded at a second fixed location of the pixel array, the first and second fixed locations each corresponding to a different respective non-overlapping group of pixels within the pixel array, the first and second fixed locations being predetermined based upon a type of the first and second feature of interest and distinct from a location of each of the first and second features within the image data.

11. The method of claim 10, further comprising altering one or more pixels in a perimeter of the pixel array to embed a CRC of each of the first and second feature-dependent codes.

12. The method of claim 11, further comprising decoding the CRC to recover each of the first and second feature-dependent codes.

13. The method of claim 10, wherein altering the image data in the pixel array comprises altering one or more pixels in the pixel array to represent an n-bit word corresponding to each of the first and second feature-dependent codes, wherein n is at least two.

14. The method of claim 13, further comprising processing the digital image to recover each of the first and second feature-dependent codes at the first and second fixed locations.

15. The method of claim 10, the step of altering the image data comprising embedding first feature-dependent code and the second feature-dependent code so as to be imperceptible to a human observer of the optical image.

16. A processor for use in an image sensor device, comprising:
    a feature module for identifying a first and second feature of interest associated with image data captured by the image sensor device in a pixel array;
    a signature module for creating a first feature-dependent code associated with the first feature of interest and a second feature-dependent code associated with the second feature of interest; and
    an embedding module for altering the image data to embed the first feature-dependent code in a first fixed location in the pixel array, and the second feature-dependent code in a second fixed location in the pixel array, the first and second fixed locations each corresponding to a different respective non-overlapping group of pixels, the first and second fixed locations being predetermined based upon a type of each of the first and second features of interest and distinct from a location of each of the first and second features within the image data.

17. The processor of claim 16, wherein the feature module comprises routines selected from a list comprising:
    an edge detection routine;
    a segmentation routine;
    a scene identification routine;
    an object detection routine;
    a metadata identification routine; and
    a Global Positioning System routine.

18. The processor of claim 17, wherein each of the first and second feature-dependent codes comprises an n-bit word to identify the respective features of interest, wherein n is at least two.

19. The processor of claim 18, further comprising a routine for altering one or more pixels in the perimeter of the image to represent a CRC of each of the first and second feature-dependent codes.

20. The processor of claim 16, the embedded first feature-dependent code and the embedded second feature-dependent code being imperceptible to a human observer of the image data when displayed as an image.

21. A system for identifying a feature of a digital image, comprising:

an imaging device with executable instructions to:
  generate image data in a pixel array corresponding to an optical image; and
  alter the image data in the pixel array to generate a digital image having a plurality of feature-dependent codes, each one of the plurality associated with a different feature of the image data, wherein each one of the plurality of feature-dependent codes are embedded at a respective fixed location of the pixel array, each fixed location corresponding to a different non-overlapping group of pixels, the fixed locations being predetermined based upon a type of the feature and distinct from a location of the feature within the image data; and
a processing device with executable instructions to:
  receive the digital image from the imaging device; and
  identify the feature of the digital image based on the plurality of feature-dependent codes embedded at different fixed locations in the pixel array.

22. The system of claim 21, wherein the processing device comprises a detection module for extracting the plurality of feature-dependent codes embedded at the different fixed locations in the pixel array.

23. The system of claim 22, wherein the imaging device further comprises executable instructions to embed a CRC of the plurality of feature-dependent codes in the perimeter of the pixel array.

24. The system of claim 23, wherein the processing device further comprises executable instructions to decode the CRC to recover the plurality of feature-dependent codes.

25. The system of claim 21, the embedded plurality of feature-dependent codes being imperceptible to a human observer of the digital image.

26. A method for identifying a feature in a digital image generated in a pixel array, comprising:
  receiving a digital image having a plurality of feature-dependent codes embedded in fixed locations in the pixel array, each fixed location corresponding to a different non-overlapping group of pixels, wherein the plurality of feature-dependent codes are associated with the feature, the fixed location being predetermined based upon a type of the feature and distinct from a location of the feature within the image data;
  processing the digital image to recover one or more pixels in each feature-dependent location; and
  comparing the one or more pixels to each feature-dependent code to identify the feature.

27. The method of claim 26, further comprising decoding a CRC code embedded in the digital image to verify whether the plurality of feature-dependent codes is present in the image.

28. The method of claim 27, further comprising displaying the digital image.

29. The method of claim 26, the plurality of embedded feature-dependent codes being imperceptible to a human observer of the digital image.

30. An image sensor apparatus, comprising:
  an image sensor for generating image data in a pixel array corresponding to an optical image; and
  a processor,
  wherein the processor generates altered image data by embedding at least a first plurality of feature-dependent codes and a second plurality of feature-dependent codes in the pixel array, the first plurality of feature-dependent codes associated with a first feature of the image data and embedded in a first fixed feature-dependent location of the pixel array, the second plurality of feature-dependent codes associated with a second feature of the image data and embedded in a second fixed feature-dependent location of the pixel array,
  wherein the processor generates a digital image from the altered image data, and
  wherein the first feature of the image data is different from the second feature of the image data, and wherein the first fixed feature-dependent location corresponds to a different non-overlapping pixel group from the second fixed feature-dependent location, the first and second fixed feature-dependent locations being predetermined based upon a type of the first and second features and distinct from locations of the first and second features within the image data.

31. The image sensor apparatus of claim 30, the embedded first plurality of feature-dependent codes and the embedded second plurality of feature-dependent codes being imperceptible to a human observer of the digital image.

* * * * *